United States Patent
Osbourne et al.

(10) Patent No.: US 7,560,412 B2
(45) Date of Patent: Jul. 14, 2009

(54) FLUID/SLURRY BED COBALT-ALUMINA CATALYST MADE BY COMPOUNDING AND SPRAY DRYING

(75) Inventors: Todd Osbourne, Springfield, KY (US); Robert O'Brien, Louisville, KY (US); Jeff Kirchner, Louisville, KY (US); X. D. Hu, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 875 days.

(21) Appl. No.: 10/918,313

(22) Filed: Aug. 14, 2004

(65) Prior Publication Data

US 2006/0035783 A1   Feb. 16, 2006

(51) Int. Cl.
*B01J 23/40* (2006.01)
*B01J 23/42* (2006.01)
*B01J 23/56* (2006.01)
*B01J 21/00* (2006.01)
*B01J 20/00* (2006.01)

(52) U.S. Cl. .................. 502/327; 502/104; 502/332; 502/355; 502/415; 502/439

(58) Field of Classification Search ............... 502/104, 502/327, 332, 355, 415, 439
See application file for complete search history.

(56) References Cited

U.S. PATENT DOCUMENTS

| | | | | |
|---|---|---|---|---|
| 3,361,682 A | * | 1/1968 | Keith et al. | 502/314 |
| 3,853,788 A | * | 12/1974 | Feins et al. | 502/255 |
| 3,980,552 A | | 9/1976 | Mickelson | |
| 4,016,106 A | * | 4/1977 | Sawyer et al. | 502/254 |
| 4,082,697 A | * | 4/1978 | Tamm | 502/334 |
| 4,113,661 A | * | 9/1978 | Tamm | 502/211 |
| 4,145,316 A | | 3/1979 | Robson et al. | |
| 4,179,411 A | * | 12/1979 | Broersma et al. | 502/322 |
| 4,623,669 A | | 11/1986 | Meier et al. | |
| 4,831,009 A | * | 5/1989 | Retallick | 502/334 |
| 4,880,523 A | * | 11/1989 | Kemp | 208/216 PP |
| 4,956,516 A | * | 9/1990 | Hamilton et al. | 585/464 |
| 5,192,734 A | * | 3/1993 | Creighton et al. | 502/314 |
| 5,302,368 A | * | 4/1994 | Harato et al. | 423/625 |
| 5,302,622 A | | 4/1994 | Chaumette et al. | |
| 5,733,839 A | | 3/1998 | Espinoza et al. | |
| 5,858,325 A | | 1/1999 | Hall et al. | |
| 6,043,187 A | * | 3/2000 | Harle et al. | 502/313 |
| 6,117,814 A | | 9/2000 | Plecha et al. | |
| 6,235,677 B1 | | 5/2001 | Manzer et al. | |
| 6,333,294 B1 | | 12/2001 | Chao et al. | |
| 6,353,035 B2 | | 3/2002 | Manzer et al. | |
| 6,503,866 B1 | * | 1/2003 | Shepherd et al. | 502/332 |
| 6,919,294 B2 | * | 7/2005 | Saito et al. | 502/305 |
| 6,927,190 B2 | * | 8/2005 | Lok et al. | 502/327 |
| 2001/0007879 A1 | | 7/2001 | Manzer et al. | |
| 2004/0127352 A1 | | 7/2004 | Jin et al. | |

FOREIGN PATENT DOCUMENTS

| | | |
|---|---|---|
| EP | 0 736 326 B1 | 8/2001 |
| JP | 01038144 | 8/1989 |
| WO | WO 01/874480 A1 | 11/2001 |
| WO | WO20044071653 A | 8/2004 |

* cited by examiner

*Primary Examiner*—Cam N. Nguyen

(57) ABSTRACT

A method for producing a cobalt on alumina catalyst is disclosed. The catalyst is prepared by thoroughly mixing cobalt nitrate into a peptized alumina slurry, and then spray-drying the slurry to form attrition resistant microspheres. The cobalt prepared by this invention is fully reducible. Optionally, metals such as ruthenium can be added to the cobalt/alumina catalyst by impregnation or methods known in the prior art.

36 Claims, No Drawings

FLUID/SLURRY BED COBALT-ALUMINA CATALYST MADE BY COMPOUNDING AND SPRAY DRYING

BACKGROUND

The present development relates to a fluid/slurry bed catalyst prepared by compounding cobalt with alumina, followed by spray drying. The resultant catalyst is easier to prepare than catalysts of the prior art because it is made using a one-pot compounding method. Further, the catalyst of the present invention has a more uniform cobalt loading, and can have a higher cobalt loading than catalysts of the prior art. The resulting catalyst surprisingly also has low attrition, a desirable cobalt crystallite size, and is fully reducible.

Cobalt on alumina catalysts are often used in chemical processes such as Fischer-Tropsch reactions, unsaturated hydrocarbon hydrogenation or alcohol amination reactions, and methods for preparing cobalt on alumina catalysts are known in the art. The most common method for preparation involves impregnating an alumina support with a cobalt-containing solution, then drying and calcining the cobalt-impregnated support, and repeating the procedure until the desired cobalt level is achieved. However, this is a time-consuming and labor-intensive process. For example, to produce a catalyst with about a 20 wt % cobalt loading typically requires up to nine steps including three separated dipping steps, three drying steps and three calcinations steps.

An alternative method of preparing a cobalt on alumina catalyst is disclosed in U.S. Pat. No. 4,179,411 (issued to Broersma et al. on Dec. 18, 1979, and assigned to Nalco Chemical Company). The '411 patent claims a method comprising preparing an alumina hydroxide gel, then purifying, forming, drying and calcining the gel. The resultant catalyst has a controlled pore volume distribution. The alumina hydroxide gel is prepared by precipitating an aluminum hydroxide from a solution of soluble aluminum salts. The precipitation is achieved by titrating the soluble aluminum salt solution with an acid or basic solution to bring the resulting pH into the range from 5-9 where a white aluminum hydroxide precipitate appears. A requirement of the claimed invention is that a polycarboxylic acid, having from 2-12 carbon atoms such as the preferred citric acid and oxalic acids, is dissolved in either the aluminum salt solution or in the titrating solution.

U.S. Pat. No. 6,353,035 (issued to Manzer et al. on Mar. 5, 2002 and assigned to Conoco, Inc.) claims a process for producing hydrocarbons from hydrogen and carbon monoxide. The catalyst is prepared by a method comprising (1) forming a catalyst gel by destabilizing the aqueous colloid comprising (a) at least one catalytic metal for Fischer-Tropsch reactions, (b) at least one colloidal oxide selected from the group consisting of cerium oxide, zirconium oxide, titanium oxide and aluminum oxide, and optionally (c) at least one alkoxide selected from the group consisting of $Al(OR)_3$, $Si(OR)_4$, $Ti(OR)_5$ and $Zr(OR)_4$, where each R is an alkyl group having from 1 to 6 carbon atoms; and (2) drying the gel. The catalytic metals recommended include iron, cobalt, nickel, ruthenium and combinations thereof. The challenge presented for the '035 catalyst preparation lies in drying the gel. In the examples recited, the gels are aged for several days and then dried under vacuum. Alternatively, a water solvent can be exchanged with a non-aqueous solvent before the gel is subjected to supercritical pressure extraction. While these drying methods are effective in the laboratory, they can be difficult and expensive to use in commercial production of a bulk catalyst.

SUMMARY OF THE INVENTION

The present development relates to a method for producing a cobalt on alumina catalyst. The catalyst is prepared by thoroughly mixing cobalt nitrate into a peptized alumina slurry, and then spray-drying the slurry to form attrition resistant microspheres. The resultant cobalt/alumina catalyst has an attrition index of approximately 1 and has a mean crystallite size of about 145 angstroms and can be fully reduced at or below about 500° C. Further, the catalyst can be produced so as to have a relatively high cobalt concentration, wherein the cobalt is added in single step, using commercial manufacturing techniques. Optionally, other metals, such as ruthenium can be added to the cobalt/alumina catalyst by impregnation or methods known in the prior art.

DETAILED DESCRIPTION OF THE PREFERRED EMBODIMENT

The catalyst of the present invention is intended for use in Fischer-Tropsch reactions, but the general method for preparation of the catalyst can be used for any catalyst requiring a relatively high metal deposition on an alumina support. Optionally, additional components, such as metal promoters and/or stabilizers, may be added to the cobalt-alumina catalyst.

The method for manufacturing the catalyst comprises compounding an aluminum oxide and a cobalt nitrate in a single pot operation, and then forming the catalyst by spray-drying followed by oven drying and/or calcination. The resulting catalyst comprises from about 5 wt % to about 60 wt % cobalt, from about 40 wt % to about 95 wt % alumina, and from about 0.0001 wt % to about 5 wt % promoters.

Specifically, an alumina slurry is prepared by dispersion and peptization, for example, by adding alumina powder to an aqueous solution of aluminum nitrate. The aluminum nitrate promotes peptizing of the alumina. Alternatively, other peptizing agents can be used in place of aluminum nitrate. For example, without limitation, a strong base, such as ammonia, or a mineral acid, such as nitric acid, or a carboxy acid, such as acetic acid, can be used in the peptization step. Optionally, the alumina slurry can then milled. A cobalt source is combined with the alumina slurry. The cobalt source can be metallic cobalt; cobalt oxide; a basic cobalt salt, such as cobalt ammine hydroxide, cobalt ammine carbonate, cobalt hydroxide, cobalt hydroxy carbonate, and combinations thereof; or an acidic cobalt salt, such as cobalt nitrate, cobalt nitrate hydrate, cobalt acetate, cobalt acetate hydrate, cobalt formate, cobalt acetylacetonate, cobalt oxalate, cobalt phosphate hydrate, and combinations thereof. The cobalt and aluminum mixture is allowed to gel. A sufficient amount of water is then added to the mixture to allow the mixture to be pumped to a high sheer mixer or colloid mill, where the mixture is homogenized under conditions that result in a slurry having a percent solids content of from about 5% solids to about 50% solids. The homogenized mixture is then spray dried at an inlet temperature set from about 350° F. to about 1000° F., at an outlet temperature set from about 220° F. to about 500° F., and at atomizer conditions appropriate to obtain microspheres of median particle size between about 10 microns and about 200 microns. The spray-dried material can be dried further in a box muffle furnace to produce the cobalt on alumina catalyst. Optionally, the resulting cobalt on alumina catalyst may be calcined at a higher temperature.

As is known in the art, metals may be further added to the cobalt on alumina catalysts to improve the catalysts' selectivity or activity or stability. In the present invention, metals can optionally be added to the cobalt on alumina catalyst by impregnation or other methods known in the art. Some exemplary promoters include, without limitation, at least one metal selected from the group consisting Na, K, Rb, Cs, Mg, Ca, Sr, Ba, Cu, Ag, Au, Sc, Y, La, Ti, Zr, Hf, V, Nb, Ta, Rh, Pd, Os, Ir, Pt, Mn, B, P, and Re.

The following examples illustrate and explain the present invention, but are not to be taken as limiting the present invention in any regard. Example 1 is a comparative example of a cobalt/ruthenium catalyst on an alumina support wherein the cobalt and ruthenium are added by a traditional impregnation method as is known in the art. Examples 2 through 4 are exemplary preparations of the inventive method for the preparation of a cobalt on alumina catalyst. Examples 6 and 7 are exemplary preparations of a catalyst prepared by the present invention and then further impregnated with additional metals.

EXAMPLE 1

Comparative Example

A catalyst is prepared by insipient wetness impregnation of alumina powder with a solution of cobalt nitrate and ruthenium nitrosyl nitrate: About 306.2 g of cobalt nitrate crystals (19.8% Co, Shepherd Chemical Company) and about 37.12 g of ruthenium nitrosyl nitrate solution (1.5 w % as Ru, Noah Technologies) are dissolved in deionized water and the volume is adjusted to about 385 ml. About 200 g of alumina (Condea Puralox SCCa 5/150) is placed in a one gallon plastic bucket and 140 ml of cobalt nitrate and ruthenium nitrosyl nitrate solution are slowly added to the alumina. The material is mixed with a spatula while the solution is added. The bucket is sealed with a lid and shaken to uniformly distribute the cobalt and ruthenium. The impregnated alumina is placed on a stainless steel tray and dried in a muffle furnace with an airflow of approximately 280 slph. The catalyst is further calcined up to 240° C. The dried and calcined catalyst is run through a 60 mesh sieve to break any loose clumps that have formed. The impregnation, drying and calcination procedures are repeated with 130 ml of the cobalt nitrate/ruthenium nitrosyl nitrate solution and then again with the balance of the solution. Yield is about 293.7 g of catalyst at 4.2% LOI (540° C.).

EXAMPLE 2

Inventive

A catalyst is prepared by the inventive method. About 5.9 kgs of DI water is added to a mixing vessel and agitation with a trilobe agitator is initiated. Approximately 178 g of aluminum nitrate ($Al(NO_3)_3H_2O$ crystals, Harrell Industries) is added to the water and allowed to dissolve into water under mild agitation. About 4.3 kgs of Catapal C-1 alumina (Condea Lot #7950) is added and mixed aggressively for about 20 minutes to allow the alumina time to peptize (gel). The slurry is then milled in a slurry mill. About 4.5 kgs of cobalt nitrate ($Co(NO_3)_3.6H_2O$, Shepherd Chemical Company) is added to the alumina mixture and gelled excessively. An additional 24.95 kgs of DI water is added to the mix to thin out the slurry to obtain a pumpable mix. The resulting slurry of about 8.6% solid content is then homogenized with the high sheer mixer (colloid mill). The slurry is spray dried on an APV (wheel atomizer) spray dryer with about 540° F. inlet temperature and about 300° F. outlet temperature and an 11,000 rpm wheel speed.

EXAMPLE 3

Inventive

A catalyst is prepared by the method of example 2 except that the catalyst is further dried at about 250° F. for approximately 1 hour in a box muffle furnace and then calcined in a box muffle at 662° F. for about 4 hours.

EXAMPLE 4

Inventive

A catalyst is prepared by the method of example 2 except that the catalyst is calcined at 932° F. for about 2 hours in a static box muffle oven.

EXAMPLE 5

Inventive

A catalyst preparation is started by adding about 7.0 kgs of DI water to a mixing vessel and agitating with a trilobe agitator. Approximately 178 g of aluminum nitrate is then added to the water and allowed to dissolve into water under mild agitation. About 3.2 kgs of the Catapal C-1 alumina which has been calcined at about 1600° F. in a static box muffle furnace for about 4 hours is added to the water/aluminum nitrate solution and mixed aggressively for 20 minutes to allow the alumina time to peptize (gel). The material does not peptize and attempts to mill the slurry are unsuccessful.

EXAMPLE 6

Inventive

A catalyst is prepared by the method of example 3 and about 187.6 g of the catalyst is added to a rotary beaker. After rotation of the beaker is initiated, about 22.1 g of ruthenium nitrosylnitrate solution (1.5 wt %, Noah Technologies) is diluted into enough water to obtain enough solution for 97% incipient wetness. The diluted solution is impregnated (dropwise) onto the carrier while rotating. After all of the solution is transferred to the carrier, the material is allowed to rotate/mix for an additional 5 minutes. The material is discharged from the rotating beaker to a porcelain dish. The sample is dried at about 250° F. for about 1 hour in a box oven. The sample is then calcined at about 932° F. for about 2 hours in a static box muffle oven.

EXAMPLE 7

Inventive

A catalyst is prepared by the method of example 4 and about 161.3 g of the catalyst is added to a rotary beaker. After starting rotation of the beaker, about 20.37 g of ruthenium nitrosylnitrate solution is diluted into enough water to obtain enough solution for 97% incipient wetness. The diluted solution is impregnated (dropwise) onto the carrier while rotating. After all of the solution is transferred to the carrier, the material is allowed to rotate/mix for an additional 5 minutes. The material is discharged from the rotating beaker to a porcelain dish. The sample is dried at about 250° F. for about 1 hour in the box-drying oven. The sample is then calcined at about 662° F. for about 2 hours in a static box muffle oven.

The physical characteristics for the catalysts of Examples 1, 2, 6, and 7 are compared in Table I. The catalysts prepared by the inventive method can have a high cobalt loading and have a more uniform cobalt distribution than the catalyst prepared by the prior art method. Catalysts prepared by the inventive method also demonstrate attrition resistance that is at least comparable to and slightly better than the catalyst prepared by the prior art method. The inventive catalyst also demonstrates comparable or better cobalt dispersion as indicated by mean crystallite size of cobalt oxide as calculated from X-ray diffraction pattern. Another important aspect of the invention is that cobalt oxide compounded with alumina can be fully reduced below 500° C. Further, the catalysts of the inventive method demonstrate conversion rates and selectivity comparable to the catalyst prepared by impregnation methods.

TABLE I

| Properties | Example 1 comp. Co/Ru | Example 2 invent. Co | Example 6 invent. Co/Ru | Example 7 invent. Co/Ru |
|---|---|---|---|---|
| Particle size, median | 91 | 50.7 | 55.4 | 47.9 |
| <20 micron | 0.0 | 0.7 | 0.4 | 0.9 |
| <40 micron | 0.5 | 24.6 | 18.9 | 29.7 |
| <80 micron | 33.7 | 89.8 | 82.3 | 93.2 |
| <105 micron | 68.2 | 97.4 | 93.5 | 98.7 |
| <140 micron | 91.1 | 99.5 | 97.9 | 99.8 |
| Surface Area | | | | |
| BET ($m^2/g$) | 98 | 158.8 | 166.5 | 160.9 |
| Nitrogen Pore Volume | | | | |
| Total (cc/g) | 0.274 | 0.225 | 0.300 | 0.296 |
| Chemical Analyses | | | | |
| % Co | 21.2 | 19.9 | 17.4 | 16.8 |
| % Ru | 0.12 | N.A. | 0.19 | 0.21 |
| Other | | | | |
| LOI @ 1000 F | 6.7 | 11.6 | 4.0 | 3.0 |
| ABD (g/cc) | 1.23 | 1.13 | 1.07 | 1.07 |
| XRD | Cobalt oxide; γ-alumina | Cobalt oxide; Boehmite | Cobalt oxide; γ-alumina | Cobalt oxide; γ-alumina |
| $Co_3O_4$ mean crystallite size, angstroms | 155 | 147 | 145 | 143 |
| Attrition Index[A] (%) | 2.2 | 1.3 | 0.7 | 0.7 |
| TPR[B] | | | | |
| % Reduction up to 500° C. (5° C./min) | | | 51 | 51 |
| % Reduction up to 500° C. hold 3 hours at 500° C. | | | 92 | 100 |

[A]Attrition Index refers to the (wt of thimble fines)/total sample wt recovered × 100% as determined when a sample is screened at 100 × 325 mesh to remove overs and fines using the standard jetcup apparatus.
[B]Temperature Programmed Reduction: 50 mg of oxide catalyst is placed in quartz tube in the presence of a gas stream comprising 5% hydrogen in argon flowing at a rate of 22 cc/min and at ambient pressure with the temperature increased at a rate of 5-10° C. per minute and the exit gas stream analyzed using a thermal conductivity detector.

The catalyst preparation method of the present invention is intended for use in manufacturing commercial-scale quantities of catalysts having relatively high cobalt loading on an alumina support.

The catalyst preparation method of the present invention differs from the method of the prior art by requiring that the cobalt and alumina be compounded and then dried, and that the drying stage be easy to execute in a large-scale production facility. It is understood that the composition of the catalyst may be varied without exceeding the scope of this development.

What is claimed is:

1. A method for the preparation of an attrition-resistant, cobalt-alumina catalyst comprising the steps:
    a) preparing an alumina slurry by combining an alumina powder with a peptizing agent, wherein said peptizing agent is selected from the group consisting of an acidic aluminum salt, an acidic cobalt salt, a mineral acid, a carboxy acid, and combinations thereof;
    b) combining a cobalt source with said alumina slurry;
    c) allowing said cobalt and alumina slurry to gel;
    d) homogenizing said cobalt and alumina gel with a sufficient amount of water to form a homogenized slurry; and
    e) spray-drying said homogenized slurry to form attrition resistant cobalt-alumina catalyst particles,
    wherein said catalyst comprises about 5 wt % to about 60 wt % cobalt and about 40 wt % to about 95 wt % alumina.

2. The method of claim 1 further including milling said alumina slurry before combining with said cobalt source.

3. The method of claim 1 further including milling said alumina slurry after combining with said cobalt source.

4. The method of claim 1 wherein said mineral acid and carboxy acid are not monobasic acids.

5. The method of claim 1 wherein said attrition resistance is less than about 2.

6. The method of claim 1 further including impregnating said catalyst particles with about 0.0001 wt % to about 5 wt % of at least one promoter.

7. The method of claim 6 wherein said at least one promoter is selected from the group consisting of Na, K, Rb, Cs, Mg, Ca, Sr, Ba, Cu, Ag, Au, Sc, Y, La, Ti, Zr, Hf, V, Nb, Ta, Rh, Pd, Os, 1k, Pt, Mn, B, P, Re, Ru and combinations thereof.

8. The method of claim 1 further including calcining said catalyst particles after spray-drying.

9. The method of claim 1 wherein said peptizing agent is selected from the group consisting of an acidic aluminum salt, an acidic cobalt salt, and combinations thereof.

10. The method of claim 1 wherein said acidic aluminum salt is aluminum nitrate.

11. The method of claim 1 wherein said acidic cobalt salt is cobalt nitrate.

12. The method of claim 1 wherein said cobalt source is selected from the group consisting of metallic cobalt, cobalt oxide, a basic cobalt salt, cobalt ammine hydroxide, cobalt ammine carbonate, cobalt hydroxide, cobalt hydroxy carbonate, an acidic cobalt salt, cobalt nitrate, cobalt nitrate hydrate, cobalt acetate, cobalt acetate hydrate, cobalt forrnate, cobalt acetylacetonate, cobalt oxalate, cobalt phosphate hydrate, and combinations thereof.

13. The method of claim 1 wherein said cobalt source is selected from the group consisting of cobalt nitrate, cobalt nitrate hydrate, cobalt acetate, cobalt acetate hydrate, cobalt fonnate, cobalt acetylacetonate, cobalt oxalate, cobalt phosphate hydrate, and combinations thereof.

14. The method of claim 1 wherein said cobalt source is cobalt nitrate.

15. The method of claim 1 wherein said homogenized slurry has a percent solids content of from about 5% solids to about 50% solids.

16. The method of claim 1 wherein said cobalt-alumina catalyst particles are microspheres having a median particle size between about 10 microns and 200 microns.

17. A catalyst made by the method of claim 1.

18. A method for the preparation of a cobalt-alumina catalyst comprising the steps:
    a) preparing an alumina slurry by combining alumina powder with a peptizing agent selected from the group consisting of aluminum nitrate, cobalt nitrate and combinations thereof;
    b) combining a cobalt source with said alumina slurry;
    c) allowing said cobalt and alumina slurry to gel;
    d) adding a sufficient amount of water to said cobalt and alumina gel so that said gel is pumpable;
    e) homogenizing said gel; and
    f) spray-drying said homogenized gel to form cobalt-alumina catalyst particles, wherein said cobalt source is selected from the group consisting of metallic cobalt, cobalt oxide, cobalt nitrate, cobalt nitrate hydrate, cobalt acetate, cobalt acetate hydrate, cobalt fonnate, cobalt acetylacetonate, cobalt oxalate, cobalt phosphate hydrate, and combinations thereon and said catalyst comprises about 5 wt % to about 60 wt % cobalt.

19. The method of claim 18 further including milling said alumina slurry before combining with said cobalt source.

20. The method of claim 19 further including milling said alumina slurry to produce a homogenized alumina slurry having a percent solids content of about 5% solids to about 50% solids.

21. The method of claim 18 further including milling said alumina slurry after combining with said cobalt source.

22. The method of claim 21 further including milling said alumina slurry to produce a homogenized alumina slurry having a percent solids content of about 5% solids to about 50% solids.

23. The method of claim 18 wherein said acidic aluminum salt is aluminum nitrate.

24. The method of claim 18 wherein said catalyst comprises about 40 wt % to about 95 wt % alumina.

25. The method of claim 18 further including impregnating said catalyst particles with about 0.0001 wt % to about 5 wt % of at least one promoter.

26. The method of claim 25 wherein said at least one promoter is selected from the group consisting of Na, K, Rb, Cs, Mg, Ca, Sr, Ba, Cu, Ag, Au, Sc, Y, La, Ti, Zr, Hf, V, Nb, Ta, Rh, Pd, Os, Ir, Pt, Mn, B, P, Re, Ru and combinations thereof.

27. The method of claim 18 further including calcining said catalyst particles.

28. The method of claim 18 wherein said cobalt source is cobalt nitrate.

29. The method of claim 18 wherein said cobalt-alumina catalyst particles are microspheres having a median particle size between about 10 microns and 200 microns.

30. A catalyst made by the method of claim 18.

31. A method for the preparation of a cobalt-alumina catalyst comprising the steps:
    a) preparing an alumina slurry by adding alumina powder to an aqueous solution of a peptizing agent, wherein said peptizing agent is selected from the group consisting of aluminum nitrate, cobalt nitrate and combinations thereof;
    b) adding a cobalt source to said alumina slurry;
    c) milling said cobalt and alumina slurry;
    d) allowing said cobalt and alumina slurry to gel;
    e) adding a sufficient amount of water to said cobalt and alumina gel so that said gel has a percent solids content of about 5% solids to about 60% solids;
    f) homogenizing said gel; and
    g) spray-drying said homogenized gel to form cobalt-alumina catalyst particles, wherein said catalyst comprises about 5 wt % to about 60 wt % cobalt.

32. The method of claim 31 wherein said spray drying is performed using a wheel atomizer spray dryer with an inlet temperature set from about 350° F. to about 1000° F., an outlet temperature set from about 220° F. to about 500° F., and a wheel speed of from about 1000 rpm to about 30000 rpm.

33. The method of claim 31 further including impregnating said catalyst particles with about 0.0001 wt % to about 5 wt % of at least one promoter, wherein said at least one promoter is selected from the group consisting of Na, K, Rb, Cs, Mg, Ca, Sr, Ba, Cu, Ag, Au, Sc, Y, La, Ti, Zr, Hf, V. Nb, Ta, Rh, Pd, Os, Ir, Pt, Mn, B, P, Re, Ru and combinations thereof.

34. The method of claim 31 wherein said cobalt source is selected from the group consisting of metallic cobalt cobalt oxide, cobalt nitrate, cobalt nitrate hydrate, cobalt acetate, cobalt acetate hydrate, cobalt formate, cobalt acetylacetonate, cobalt oxalate, cobalt phosphate hydrate, and combinations thereof.

35. The method of claim 31 wherein said peptizing agent is cobalt nitrate and said cobalt source is cobalt nitrate.

36. A catalyst made by the method of claim 31.

* * * * *